Jan. 10, 1967   E. G. DANNER   3,297,886
MULTI-RECEPTACLE ELECTRIC OUTLET AND MOUNTING MEANS
Filed Nov. 14, 1963   2 Sheets-Sheet 1

INVENTOR.
EUGENE G. DANNER
BY
ATTORNEY

Jan. 10, 1967  E. G. DANNER  3,297,886
MULTI-RECEPTACLE ELECTRIC OUTLET AND MOUNTING MEANS
Filed Nov. 14, 1963  2 Sheets-Sheet 2

INVENTOR.
EUGENE G. DANNER
BY
ATTORNEY 3,297,886
MULTI-RECEPTACLE ELECTRIC OUTLET AND
MOUNTING MEANS
Eugene G. Danner, 91—22 71st Road,
Forest Hills, N.Y. 11375
Filed Nov. 14, 1963, Ser. No. 323,699
5 Claims. (Cl. 307—112)

The present invention relates to remote electric outlets or receptacles in which a plurality of remote electrical outlets are provided having an electric conductor or extension for conveying electric power from a wall or floor electric outlet to such remote outlet. The present invention provides a plurality of conveniently spaced electric receptacles featuring at least one controlled outlet with a convenient mounting means which permits placement of the apparatus, within the limitation of the extension associated therewith, within easy reach, while remote from a wall receptacle from which electric power is provided through the electric conductor associated with such remote outlets.

More particularly, the present invention provides a new electric extension terminating in a plurality of electric receptacles eliminates multiple receptacles at a wall or floor electric output and places such plurality of controlled and uncontrolled electric outlets at a desirable, more convenient position. Associated with, and made a part thereof, is a convenient means for mounting the apparatus on a tank or other vessel, such as an aquarium, which may require a plurality of electric outlets in substantially close proximity, for providing power to drive various electrical apparatus, such as water filtering devices, water temperature control and/or a water airation device, generally used in the water of tanks in which tropical fish and other warm water aquatic life are bred, raised and/or generally maintained.

It is well known to provide means for duplicating a wall socket or receptacle which prvoides an outlet for electric current through use of a well known male electric plug. Such a device is generally referred to as an "octopus" and is sometimes plugged into a wall socket or outlet while at other times the "octopus" may be made remote, with a two lead connection to a plug for inserting into the wall socket or receptacle.

Such outlet multiplying devices are unsightly, dangerous, lack a convenient mounting and require manual disconnection of an electric device from the outlet multiplying device for disrupting the normal flow of current to any "plug-in" electrical apparatus which has no on-off switch of its own.

In contrast, the present invention provides a plurality of spaced, uncontrolled electric outlets and a plurality of spaced controlled electric outlets with a convenient mounting means for locating such outlet multiplying apparatus on the exterior of a tank or aquarium. In addition, one form of the present device provides an internal fused circuit for providing electric power to the receptacles provided, with the addition of a visual indicator means associated with the controlled outlets.

The present invention has been designed to eliminate the unsightly appearance of the common "octopus" and presents a neat, remote means of relocating a plurality of electric outlets. In parallel with the remote "octopus", the present apparatus is provided with a two lead conductor and a multi-prong male type electric plug for inserting into a wall or floor electric socket or outlet. While the "octopus" has a general octagon appearance and has the plurality of receptacles spaced on opposite sides of the octagon faces, the present invention is rectangular in shape with the receptacles arranged on the opposite sides of the rectangular plate, according greater separation of the receptacles than found in "octopus". It will be appreciated that in order to insert or extract any plug from the "octopus" the "octopus" is normally held in one hand and any plug is inserted into an open receptacle or extracted from a receptacle by the other hand. Because of the location of the receptacles ofthe "octopus" around the perimeter of the octagon, handling such device becomes dangerous when the receptacles of this "octopus" are "alive" and the fingers and/or hands are wet. The present invention provides for a greater separation of remote receptacles and receptacle free surfaces that permit handling of the device without the danger of placing the fingers over any one or more receptacles located on the side of the rectangular arrangement.

The mounting means associated with certain of the forms of the present invention serves not only for mounting the remote receptacles, but as a convenient handle. The addition of an internally fused circuit, in certain forms of the invention, guards against overloading the line and against fire caused by such overloading. Another aspect of the present invention is the addition of visual indicators in association with the controlled receptacles for indicating, visually, when the receptacle receiving power from the wall socket is "alive" or "on" and when the controlled receptacle is turned off.

An object of the present invention is to provide a plurality of remote controlled and uncontrolled receptacles or outlets for electric power remotely connected but removed from a wall electric socket or receptacle.

Another object is to provide a plurality of remote electric outlets, at least one of which is controlled and has associated therewith a means for visually indicating the condition of the controlled receptacle.

Another object is to provide a plurality of remote, spaced receptacles for providing electric power at one or more controlled receptacles and one or more uncontrolled receptacles with associated means for conveniently mounting such device on the exterior of a tank or aquarium.

A further object is to provide a plurality of remote, spaced receptacles for providing electric power from a wall or other outlet for electric power in which the mounting means associated with the remote receptacle is adjustable.

These and other objects will become more apparent from reading the following description with reference to the accompanying drawings in which:

FIG. 1 shows one form of remote, spaced multi-receptacle device and mounting means, mounted on the top and side exterior of a fish tank or aquarium with electric connector for plugging into a wall or other electrical outlet;

FIG. 2, including FIGS. 2a and 2b, shows the internal structure of the housing or shell for supporting the bridged, spring conductors to the uncontrolled and controlled receptacles which, when fitted face to face, as shown, provides one form of the invention, from which the controlled switch means have been omitted;

Figure 1:
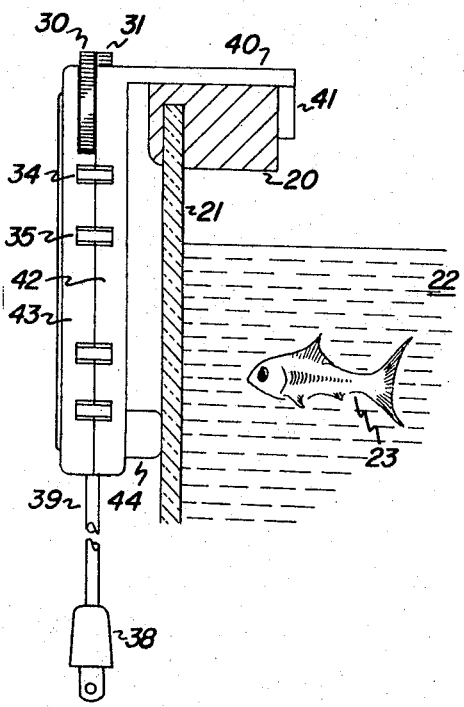

Referring now to FIG. 1, the preferred form of the invention is illustrated, mounted on the top 20 and side 21 of the exterior of an aquarium. The water 22 and fish 23 are shown merely to illustrate one use of such multi-receptacle electric outlet. FIG. 1 shows the present device in side view with the discs 30 and 31 of the wafer switches mounted to provide finger-tip control of the electric outlets, one disc mounted in each upper corner of the device. The controlled outlet, on the side shown, includes the two upper openings 34 and 35 into which an electric plug may be inserted. The disc 30 serves as a control for the internally located switch (see FIG. 3). The internal arrangement for supplying electric power to the receptacle 34 and 35 from the wall socket through the plug 38 and conductor 39 is shown in FIGS. 2a, 2b and in circuit form in FIG. 11.

Figure 2A:
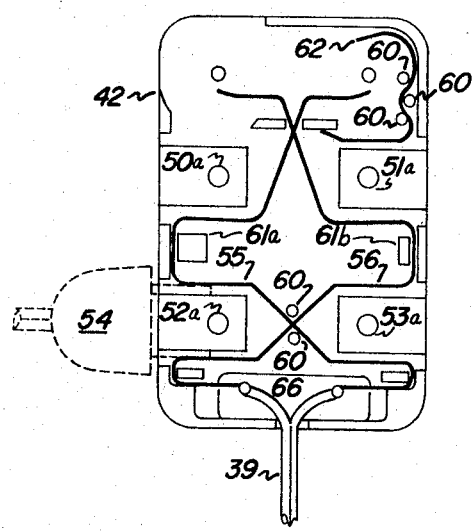
Figure 2B:
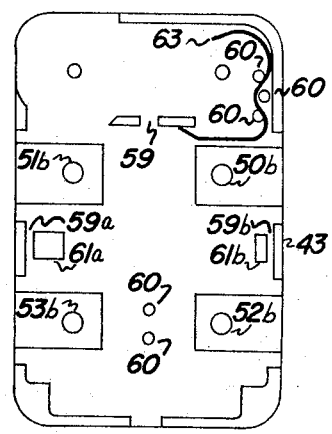

The mounting bracket or hanger 40/41 includes a horizontal member 40 and a vertical member 41 with the horizontal member extended from the part 42 of the two-part housing or shell 42 and 43, made of non-conductor material, used to support the internal structure of conductor materials (see FIGS. 2a, 2b).

A stand-off 44 holds the multi-receptacle outlet away from the exterior of the glass wall or side of the tank or aquarium so that the device hangs substantially vertical from the frame 20 of the aquarium.

FIG. 2, including FIGS. 2a and 2b, illustrates the two-part or two-section housing or shell with the interior faces illustrated. In the preferred form, the shells are of molded plastic, non-conductor material. The circles 50a, 51a, 52a and 53a on shell 42 represent holes in the shell 42 while the circles 50b, 51b, 52b and 53b on shell 43 represent holes in the shell 43. When shell 43 is placed face-to-face over shell 42 such holes become aligned, hole 50a with 50b, 51a with 51b, etc., and provide a means for securing the two parts of the two-piece shell, as by passing small screws through the holes and securing such screws with a nut. Other securing means such as rivets or expandable eyelets may be used to hold the two parts together, in an obvious manner. The horizontal member 40 of the bracket or hanger would extend horizontally from the upper part of the back of shell 42 and is hidden from view.

Bridged, spring conductors 55 and 56 are shown in symmetrical form fitted into supporting or spring retaining channels such as 59, 59a and 59b (FIG. 2b) and are held by such channels in cooperation with spring retaining pins such as 60 (seen in both FIGS. 2a and 2b).

The supporting or spring retaining channel 59 is formed by the opening between the two longitudinal channel defining members, raised substantially to the level of the pins 60. The retaining channel 59a also approaches the depth of channel 59, the channel 59a being formed by the channel defining member 61a and the side or frame of the shell half. Channel 59b differs somewhat from the other channels in that channel 59b is not as deep as the other channels, the base or floor of 59b forming a raised shoulder, raised somewhat above the base or floor of the form or shell half but somewhat below the level of the pins 60. The channel defining member 61b cooperates with the side or frame of the shell half to form channel 59b, the base of the channel being raised to form a shoulder at the ends of the channel.

Since each shell half or part is substantially symmetrical, except that shell part 42 includes a block for the base terminal connections 66, each shell half includes the respective retaining channels and the channel defining members.

When the shell part 43 is fitted face-to-face over shell part 42, then the deep retaining channel 59a and the shallow retaining channel 59b of shell part 43 will cooperate with shallow retaining channel 59b and the deep retaining channel 59a of shell part 42, respectively. Thus the complete shell (of the two combined halves) will include an internal spring retaining channel on each internal side with each channel offset from the other, relative to the common face.

The symmetrical bridged, spring conductors 55 and 56 may each be bridged at that part of the spring that fits into the channel 59a/59b with the bridge in the conductor cut on the same side, when formed, so that when the bridged, spring conductors are set into the shell part, one reversed from the other, the bridged part of the bridged, spring conductor at 59a/59b will be retained by the shoulder of the shallow part of the channel and the conductor will be prevented from shifting when the prongs of a plug, such as 54 are inserted into the receptacle.

Figure 3:
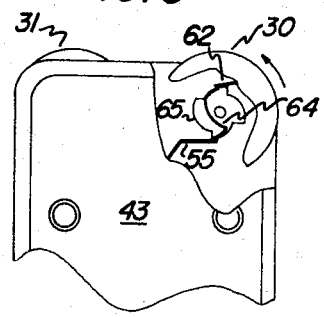
FIG. 3 is a part sectional view of one form of wafer switch provided for the controlled receptacles on opposite sides of the present invention.

The spring conductors 62 in FIG. 2a and 63 in FIG. 2b, respectively form part of the respective switch for the respective controlled receptacles, and are symmetrical (see FIG. 3).

The bridged, spring conductor 55 and 56 are bridged at the crossing points, using space insulation. The bridged, spring conductors and the spring conductors are preferably made of any of the well known metal conductor materials capable of being formed into the configuration substantially as shown. Such material should also have sufficient flexibility to provide sufficient spring action to maintain connection with the prongs of an electric plug inserted into the holes of the receptacles, such as plug 54, in phanton form.

FIG. 3 illustrates the upper part of the two-part shell with one wafer switch, in sectional form. The bridged, spring conductor 55 and the spring conductor 62 are shown, in part, with the finger tip or disc control of the wafer switch cutout showing the stepped cam 65. This view is shown with the wafer switch in the "on" position as seen by the conductor material 64, on the cam 65. The conductor material 64 electrically connects the spring conductor 62 and bridged spring conductor 55, across the face of the cam 65 from opposite steps of the stepped cam 65. By rotating the finger tip control one quarter turn, in the direction of the arrow, the controlled receptacle will be turned "off" even though the plug 38 may be inserted into a wall or other electric socket, receptacle or outlet supplying power to the bridged, spring conductors, through the base terminal connections 66.

Figure 4:
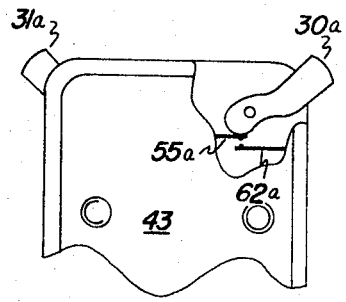
FIG. 4 is a part sectional view of another form of switch controlled receptacle employing snap-type switches for the controlled receptacles.

FIG. 4 shows an alternate form of finger tip control switch for the controlled receptacles, with the bridged, spring conductor 55a and spring conductor 62a of slightly different configuration from that shown in FIGS. 2a and 2b. A snap or wing-switch, 30a serves the same function as the disc 30 except that the disc 30 will be rotated around a pivot support for on/off operation of the waffer switch while the wing-switch is moved in a counter clockwise direction for on and a clockwise direction for off, around its pivot support.

Although two arrangements of switch control are shown, obviously others may be used as alternates, therefore.

Figure 5:
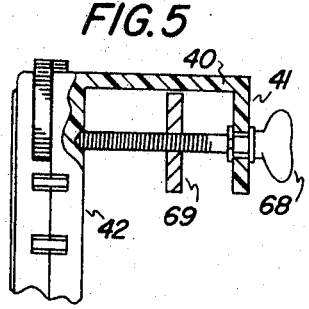
FIG. 5 is a side view, in section, of one form of adjustable mounting means with a thumbscrew arrangement and traveling member providing a vice-like, screw-adjustable clamp.

FIG. 5 illustrates, in part sectional view, an adjustable type hanger or mount for providing a vice-like adjustable mounting of the multi-receptacle electric outlet extension device. A captive wing or thumb screw 68 is supported by inserting the shaft of the screw through the vertical member 41 to a seat in the shell 42 and is held captive by spring locking washers on either side of the vertical member 41. A traveling member 69 includes a threaded hole through which the threaded shaft of screw 68 is passed and such traveling member, 69, is moved by turning the captive wing or thumb screw 68, as desired. The horizontal member 40 of the hanger prevents the traveling member 69 from rotating when the captive screw is rotated and the member 69 moves along the threaded captive screw, reducing the space between the shell 42 and the member 69. This provides a vice-like effect, firmly clamping the multi-receptacle electric outlet extension to a frame, such as 20 in FIG. 1 of a tank or aquarium, thus providing an adjustable hanger for the present device.

Figure 6:
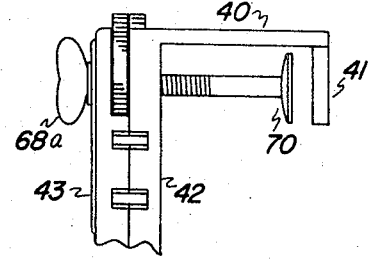
FIG. 6 is an alternate form adjustable clamp mounting for use with the present device.

FIG. 6 illustrates an alternate form of adjustable hanger in which a wing or thumb screw or clamp 68a is mounted in a threaded hole in the upper part of the two piece shell 42/43 with a clamp pad 70 at the end of the thumb screw or clamp 68a for providing an adjustable gripping or clamping effect, in association with the vertical member 41 for firmly or more securely mounting the multi-receptacle electric outlet extension device.

Figure 7:
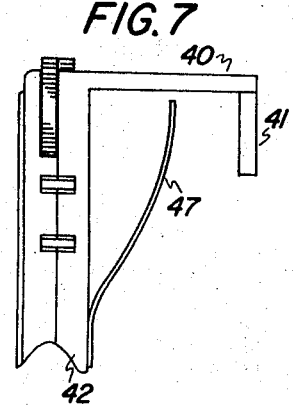
FIG. 7 is another alternate form of mount including a pressure spring and hanger mounting.

FIG. 7 illustrates another alternate form of hanger in which a spring 47 serves to provide a means for applying a clamping or gripping effect in association with the vertical member 41, the spring 47 being mounted at its one end on the shell part 42.

Figure 8:
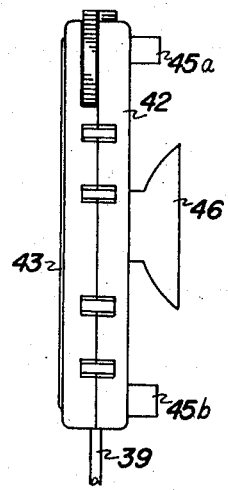
FIG. 8 is a side view of the invention providing a suction type mounting with stand-offs or feet for holding the present invention away from the surface on which the suction cup has been applied.

FIG. 8 illustrates an alternate form of mount in which the hanger 40/41 has been eliminated and a suction cup 46, mounted on shell part 42, is employed to hold the multi-receptacle device to a surface or other plane. This arrangement features stand-offs, for example 45a and 45b, which may be located, one each, at the four corners of the shell part 42 to hold the receptacle device away from the plane on which it may be mounted by means of the suction cup 46. Such stand-offs may be made of some resilient material, if desired.

Figure 9:
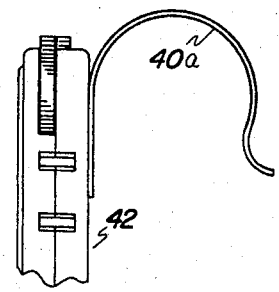
FIG. 9 is another alternate form of mount employing a C type spring clamp.

FIG. 9 illustrates an alternate form of hanger represented in C shape. Such C shape hanger 40a may be affixed to the shell half 42 and may be made of any material having spring-like qualities.

Figure 10:
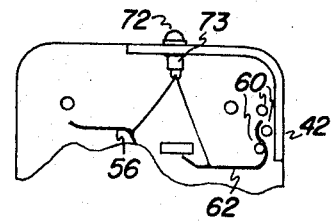
FIG. 10 illustrates, in partial view, an indicator mounted in one section, such as shown in FIG. 2b, of the shell of the present apparatus.

FIG. 10 illustrates an indicator lamp 72 and lamp socket 73 mounted in the shell half 42 with connections from the lamp socket to the bridged, spring conductor 56 and to the spring conductor 62. In like fashion an indicator lamp and lamp socket may be mounted in shell half 43 with connection from such lamp socket to the bridged, spring conductor 55 and spring conductor 63. Obviously, the indicator lamp 72 may be mounted without a socket if a socketless form of lamp is used.

Figure 11:
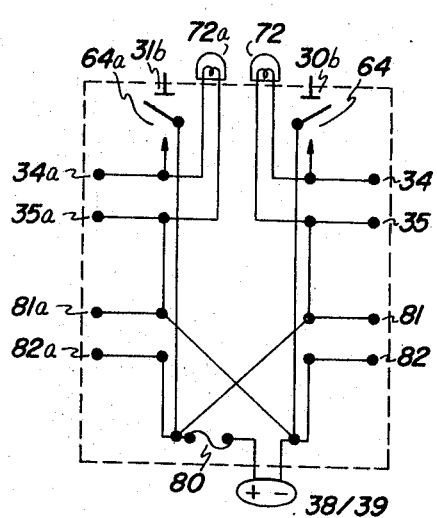
FIG. 11 is a circuit diagram of the interior of the present circuit, including two uncontrolled receptacles or output positions, two controlled receptacles or output positions and the associated switches and indicators for the controlled receptacles.

Although the preferred form of housing or shell is illustrated in FIGS. 2a and 2b the present invention anticipates other forms or arrangements, such as a shell in which a fuse is included in the internal circuitry of the multi-receptacle electric outlet extension device, and/or indicator lamps, such as illustrated in FIG. 10 have been added to the shell. In this regard FIG. 11 is presented showing, in schematic circuit form, the internal circuitry of the multi-receptacle electric outlet extension device, including an extension connector line and plug 38/39, a fuse 80, the terminals of uncontrolled receptacles or outlets 81/82 and 81a/82a, the terminals for the controlled receptacles or outlets 34/35 and 34a/35a, the contacts or switches 64 and 64a, the finger tip controls 30b and 31b for the respective contacts or switches and the indicator lamps 72 and 72a.

It is anticipated that the circuitry within the interior of the multi-receptacle device may be made in printed circuit form or may be made in conventional form with conventional wiring or other conductor materials.

The preferred form, as illustrated in FIGS. 2a and 2b is made so that the bridged, spring conductors are symmetrical in form and may be made by a stamping or other process. Each bridged, spring conductor, in its preferred form has part of the width of the conductor removed where the two bridged, spring conductors cross, such as at the lower two retaining pins 60, and at that part of the conductor that passes through the retaining channel 59a/59b.

Although the preferred form of multi-receptacle electric outlet extension, including the hanger or mounting means has been illustrated and alternate forms of hangers and alternate forms of mounting means have been illustrated other alternate forms of the present inventions, obvious to those skilled in the art, as by substitution or rearrangement of parts, may be made without departing from the spirit of the invention within the scope of the claims.

I claim:
1. A multi-outlet electric extension for mounting on a tank or aquarium including a two prong electric plug adapted to be inserted into a wall or other electric outlet for providing electric power therefrom, a two part housing coupled face-to-face to provide a hollow interior in which are formed symmetrical channels, a plurality of pairs of spaced holes on opposite sides of said two part housing, each pair of spaced holes arranged to receive a two prong electric plug, a first bridged spring conductor seated in one of the symmetrical channels and arranged to make contact with one prong of a two prong electric plug which may be inserted into any pair of said spaced holes, means for electrically coupling one prong of the first mentioned two prong electric plug to said first bridged spring conductor, a second bridged spring conductor seated in the other of the symmetrical channels and arranged to make contact with the other prong of a two prong electric plug which may be inserted into any pair of said spaced holes, means for electrically coupling the other prong of said first mentioned two prong electric plug to said second bridged spring conductor, said first bridged spring conductor including switch means for electrically disconnecting said one prong of said two prong electric plug inserted into a certain pair of said spaced holes for providing a controlled electric outlet, hanger means extending from one part of said two part housing on part of said tank or aquarium.

2. A multi-outlet electric extension as in claim 1 and in which said second bridged spring conductor includes another switch means for electrically breaking contact with one prong of a two prong electric plug inserted into another certain pair of said spaced holes for providing a second controlled electric outlet of said multi-outlet electric extension.

3. A multi-outlet electric extension for mounting on a tank or aquarium as in claim 1 in which the said hanger means includes a horizontal member extending from the upper part of the back of one part of said two part housing and a short vertical member extending substantially downward for the end of the horizontal member opposite the said back of said one part, for hanging said multi-outlet from the perimeter of said tank or aquarium.

4. A multi-outlet electric extension for mounting on a tank or aquarium as in claim 1 and in which said hanger means includes a horizontal member extending from the back of one part of said two part housing and a short downwardly extending member, from the opposite end of the horizontal member and clamp means for adjustable reducing the space between the said back of said one part and said short downwardly extending member, for adjustable gripping part of the said tank or aquarium.

5. A multi-outlet electric extension for mounting on a tank or aquarium as in claim 1 and in which said hanger means includes suction means for mounting said multi-outlet extension on a plane and stand-off means for holding said multi-outlet at a substantially equal distance from said plane relative to the back surface of said multi-outlet extension.

References Cited by the Examiner

UNITED STATES PATENTS

| | | | |
|---|---|---|---|
| 2,484,092 | 10/1949 | Hopgood. | |
| 2,563,066 | 8/1951 | Procapio | 307—149 |
| 2,696,607 | 12/1954 | Witkin | 307—112 X |
| 3,049,688 | 8/1962 | Sinopoli | 339—128 X |

ORIS L. RADER, *Primary Examiner.*

T. B. JOIKE, *Assistant Examiner.*